(12) United States Patent
Greene et al.

(10) Patent No.: US 9,739,322 B2
(45) Date of Patent: Aug. 22, 2017

(54) ELECTRIC ACTUATOR MODULE FOR SELECTABLE CLUTCH

(71) Applicant: MAGNA POWERTRAIN OF AMERICA, INC., Troy, MI (US)

(72) Inventors: Darrell Greene, Bradford (CA); Adrian Cioc, Richmond Hill (CA)

(73) Assignee: Magna Powertrain of America, Inc., Troy, MI (US)

( * ) Notice: Subject to any disclaimer, the term of this patent is extended or adjusted under 35 U.S.C. 154(b) by 126 days.

(21) Appl. No.: 14/844,817

(22) Filed: Sep. 3, 2015

(65) Prior Publication Data

US 2015/0377306 A1    Dec. 31, 2015

Related U.S. Application Data

(63) Continuation of application No. 13/838,336, filed on Mar. 15, 2013, now Pat. No. 9,127,730.

(60) Provisional application No. 61/715,121, filed on Oct. 17, 2012.

(51) Int. Cl.
*F16D 41/16* (2006.01)
*F16D 27/09* (2006.01)
*F16D 27/00* (2006.01)

(52) U.S. Cl.
CPC ............. *F16D 41/16* (2013.01); *F16D 27/09* (2013.01); *F16D 27/00* (2013.01)

(58) Field of Classification Search
CPC .......... F16D 41/12; F16D 41/14; F16D 41/16; F16D 27/09; F16D 27/10; F16D 27/102; F16D 27/118; F16D 27/12
See application file for complete search history.

(56) References Cited

U.S. PATENT DOCUMENTS

| 1,900,787 | A  | 3/1933  | Baugnee       |
| 4,222,473 | A  | 9/1980  | Kopich        |
| 5,927,455 | A  | 7/1999  | Baker et al.  |
| 5,996,758 | A  | 12/1999 | Baxter, Jr.   |
| 7,383,930 | B2 | 6/2008  | Kimes et al.  |
| 7,432,445 | B2 | 10/2008 | Bird et al.   |
| 7,448,481 | B2 | 11/2008 | Kimes et al.  |
| 7,451,862 | B2 | 11/2008 | Kimes et al.  |
| 7,455,157 | B2 | 11/2008 | Kimes et al.  |
| 7,475,763 | B2 | 1/2009  | Jegatheeson   |

(Continued)

*Primary Examiner* — Richard Lorence
(74) *Attorney, Agent, or Firm* — Dickinson Wright PLLC (57) ABSTRACT

A clutch module which includes a first rotating member including at least one strut actuation module and a second engaged member including cam surfaces thereon for engagement by said strut actuation module. The strut actuation module includes a frame with a strut pivotally movable with respect to the frame. The strut includes an engagement end and a base end including a first side and a second side thereof. A pin or post portion extends from the frame and has an insulated bobbin with an energizable coil surrounding the bobbin. A U-shaped member including a pair of actuation legs is attached to the pin member and forms a magnetic gap between the base end of the strut and peripheral ends of the legs, such that when the coil is energized the peripheral ends of the legs are polarized in a first polarity and the frame and the strut are polarized with an opposite polarity thereby biasing the strut toward the peripheral ends and pivoting the actuation end into engagement with a cam surface of the engagement member.

16 Claims, 7 Drawing Sheets

(56) References Cited

U.S. PATENT DOCUMENTS

| | | |
|---|---|---|
| 7,500,548 B2 | 3/2009 | Kimes et al. |
| 7,614,486 B2 | 11/2009 | Bird et al. |
| 7,661,518 B2 | 2/2010 | Kimes |
| 7,690,492 B2 | 4/2010 | Gooden et al. |
| 7,735,546 B2 | 6/2010 | Bird et al. |
| 8,276,725 B2 | 10/2012 | Swales et al. |
| 8,403,123 B2 | 3/2013 | Bird et al. |
| 8,418,825 B2 | 4/2013 | Bird |
| 2003/0057047 A1 | 3/2003 | Jin |
| 2004/0159517 A1 | 8/2004 | Thomas |
| 2007/0056825 A1 | 3/2007 | Fetting, Jr. et al. |
| 2008/0142243 A1 | 6/2008 | Bird et al. |
| 2009/0145718 A1 | 6/2009 | Chiesa et al. |
| 2009/0194381 A1 | 8/2009 | Samie et al. |
| 2010/0122883 A1* | 5/2010 | Bartos et al. .......... F16D 41/16 192/43.1 |
| 2010/0140041 A1 | 6/2010 | Wittkopp et al. |
| 2011/0011694 A1 | 1/2011 | Swales et al. |
| 2011/0057522 A1 | 3/2011 | Blessing et al. |
| 2011/0290608 A1 | 12/2011 | Bird et al. |
| 2012/0100948 A1 | 4/2012 | Lin et al. |
| 2012/0103745 A1 | 5/2012 | Bird |
| 2012/0103746 A1 | 5/2012 | Bird |
| 2012/0103747 A1 | 5/2012 | Bird |
| 2012/0123635 A1 | 5/2012 | Brevick et al. |
| 2012/0152683 A1 | 6/2012 | Kimes |
| 2013/0056327 A1 | 3/2013 | Schraff |
| 2013/0213027 A1 | 8/2013 | Bird et al. |

\* cited by examiner

ELECTRIC ACTUATOR MODULE FOR SELECTABLE CLUTCH

CROSS-REFERENCE TO RELATED APPLICATIONS

This application is a continuation of U.S. application Ser. No. 13/838,336 filed Mar. 15, 2013 which claims the benefit of U.S. Provisional Application No. 61/715,121 filed Oct. 17, 2012. The entire disclosure of each of the above applications is incorporated herein by reference.

FIELD OF THE INVENTION

The present disclosure relates generally to an actuator module for a selectable clutch. More particularly, the present disclosure relates to a transmission for use in a drivetrain of a vehicle (such as an automobile truck, van, utility, industrial equipment, fleet, cargo or the like) including a strut-type actuator module for use in selectively actuating a clutch in the transmission.

BACKGROUND OF THE INVENTION

A selectable one way clutch (OWC) to be used in automatic transmissions replaces the friction discs OWC actuated by oil pressure with a strut-based selectable OWC actuated by an electromagnetic module controlled by the transmission ECU. This reduces the drag losses associated with the friction disc clutch of prior designs when it is open and over-running continuously while the transmission is running and may also offer cost reductions associated with the removal of the components of the friction discs clutch (friction discs, pressure plates, end plate, piston and seals).

In one prior art embodiment of a selectable OWC for a transmission, a coil is wound around a steel magnetic pole, which when electrically energized, acts to close the gap (such as an air gap) between the end poles (i.e., north and south) and the one-way clutch strut end. In this design, the pole ends are magnetized, which work to attract the end portion of the strut, which is not magnetized.

In the above concept, the clutch housing does not play any role in the magnetic circuit; it only controls the relative position of the coil and struts. When an electrical charge is applied, the mechanism pulls the strut from the open position toward the closed position. The pole is magnetized and the strut is not magnetized so the housing is not part of the magnetic circuit or path.

While this arrangement is one method of actuating a strut, it requires single pole magnetic attraction which is not as robust or reliable of a lock up as might be desired depending on the application. Therefore, it is desirable in the art to provide a more robust actuation of a strut in a selectable OWC.

SUMMARY OF THE INVENTION

In accordance with the present invention there is provided a clutch assembly. The clutch assembly includes a clutch module and at least one strut actuation module. The clutch module includes a first clutch member to which the at least one strut actuation module is mounted, and a second clutch member including cam surfaces thereon for selective engagement by the strut actuation module. The strut actuation module includes a frame fixed to the first clutch member with a strut pivotally movable with respect to the frame. The strut includes an engagement end and a base end including a first side and a second side thereof. A pin or post portion extends from the frame and has an insulated bobbin with an energizable coil surrounding the bobbin. A U-shaped member including a pair of actuation legs is attached to the pin member and forms a magnetic gap between the base end of the strut and peripheral ends of the actuation legs, such that when the coil is energized the peripheral ends of the actuation legs are polarized in a first polarity and the frame and the strut are polarized with an opposite polarity thereby biasing the strut toward the peripheral ends and pivoting the actuation end into engagement with one of the cam surfaces of the second clutch member.

In alternate embodiments, bi-directional strut arrangements are provided.

In accordance with the present invention, there is provided an improved device and control strategy for an OWC clutch for use in a transmission in a vehicle wherein the housing of the clutch actuator is included as part of the magnetic circuit for actuating the mechanism to create a stronger magnetic actuator device and to provide greater accuracy and control while reducing the power consumption and other negative drawbacks of the known mechanisms and controls.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein.

DETAILED DESCRIPTION OF THE PREFERRED EMBODIMENTS

In accordance with the present invention there is provided a clutch assembly, generally shown at 10, of the type for example for use in a transmission (not shown) which is controlled using an on-off relay to actuate a clutch mechanism.

Referring to the drawings, and initially to FIGS. 1-4, there is provided a clutch assembly 10 having a clutch module and an actuation module. The clutch module includes a first clutch member 12 supporting at least one strut actuation module 14, and a second clutch member 16 having cam surfaces 17 thereon for selective engagement by strut actuation module 14. The clutch members 12 and 16 are aligned axially adjacent to each other and at least one of the clutch members is adapted to rotate relative to the other clutch member. The clutch members 12 and 16 include engagement teeth or splines 12(a) and 14(a) respectively to facilitate connection of each to another rotary or non-rotary component of the transmission. The strut actuation module 14 includes a frame 18 with a strut 20 pivotally movable with respect to frame 18 about a pivot 22. Frame 18 is adapted to be fixedly secured to first clutch member 12 in the configuration shown. The strut 20 includes an engagement end 26 and a base end 24 and further includes a first side 28 and a second side 30. A pin or post portion 32 extends from the frame 18 and has an insulated bobbin 34 with an energizable coil 36 surrounding the bobbin 34. A U-shaped member 37 is secured magnetically and mechanically to the post 32 by way of a screw or other fastener 39. The U-shaped member 37 includes a pair of actuation legs 38 and 40. A biasing spring 42 (such as the accordion spring shown) is provided in a bore 44 in the frame 18. At rest, the biasing spring 42 biases the strut 20 out of engagement with the cam surfaces 17 to provide a normally disengaged freewheeling condition, whereby second clutch member 16 is permitted to rotate relative to first clutch member 12. The peripheral ends 46 and 48 form a magnetic gap between the base end 24 of the strut 20 and peripheral ends 46 and 48 of the legs 38 and 40.

When the coil 36 is energized, the peripheral ends 46 and 48 of the legs 38 and 40 are polarized in a first polarity and the frame 18 and the strut 20 are polarized with an opposite polarity, thereby biasing the strut 20 toward the peripheral ends 46 and 48 and pivoting the engagement end 26 into engagement with a cam surface 17 of the second clutch member 16.

Typically, the actuation module is contained in a metallic housing. Thus in the present invention, the housing can be used as an integral component of a magnetic circuit for controlling the clutch. When the coil 36 is powered, the housing is magnetized and will take a particular polarity (i.e., either north or south as may be desired) that is opposite from a polarity of the magnetic poles of an actuator, in this instance the U-shaped member 37 coupled to the clutch mechanism. Since the housing is in contact with struts, the struts will be magnetized with the same polarity as the housing. In this application, the attraction force between the strut ends and the magnetic poles of the U-shaped member 37 (i.e., across the air gap between them) is greatly increased as compared with the case where the struts carry a neutral charge from a magnetic perspective.

While the strut 20 is shown to be pivotal about a pin 22 it is to be appreciated by those skilled in the art that the strut can be configured as being pivotable in a suitable housing in the member 12.

Figure 1:
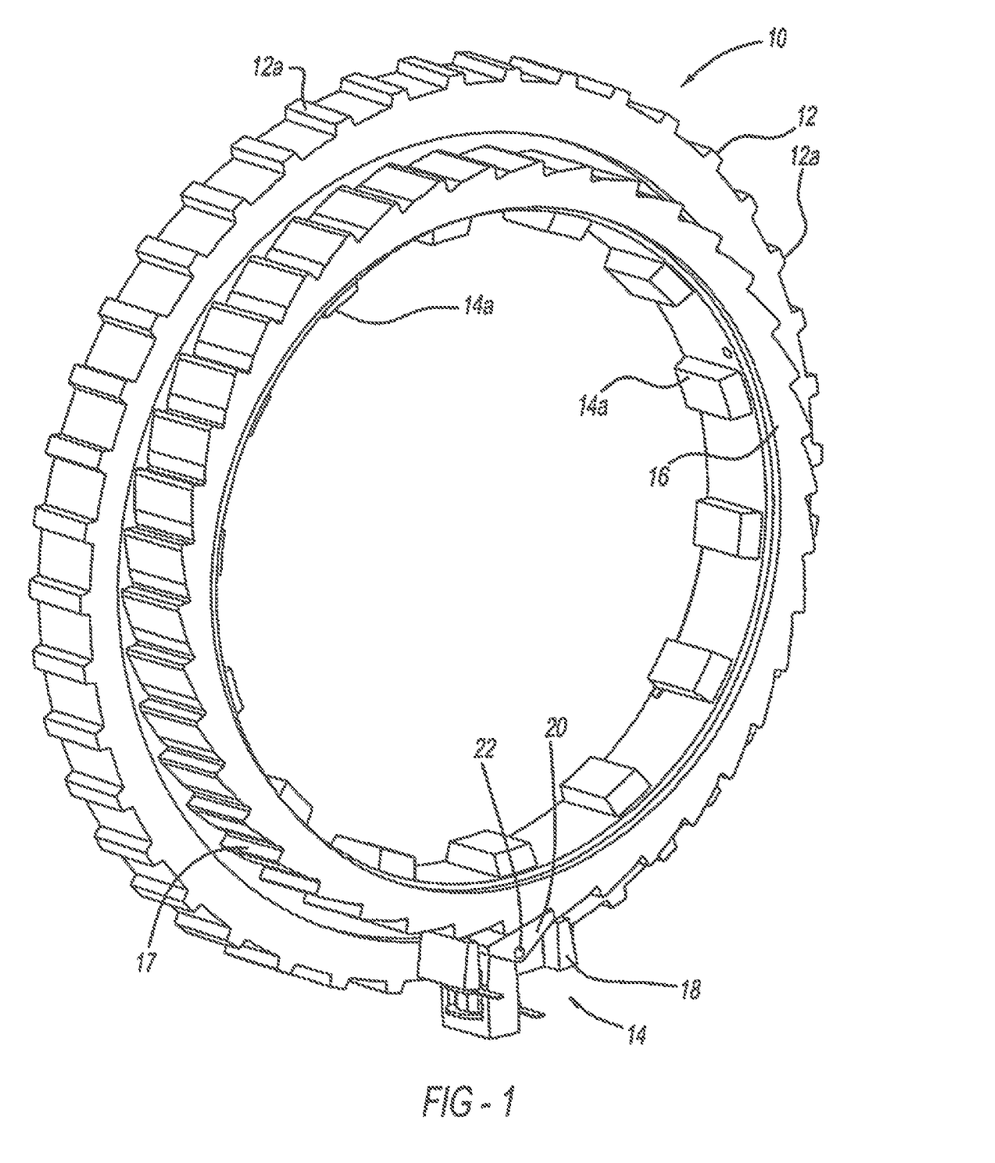
FIG. 1 is an assembly view of a clutch assembly showing a clutch module and a strut actuation module in accordance with the present invention.
Figure 2:
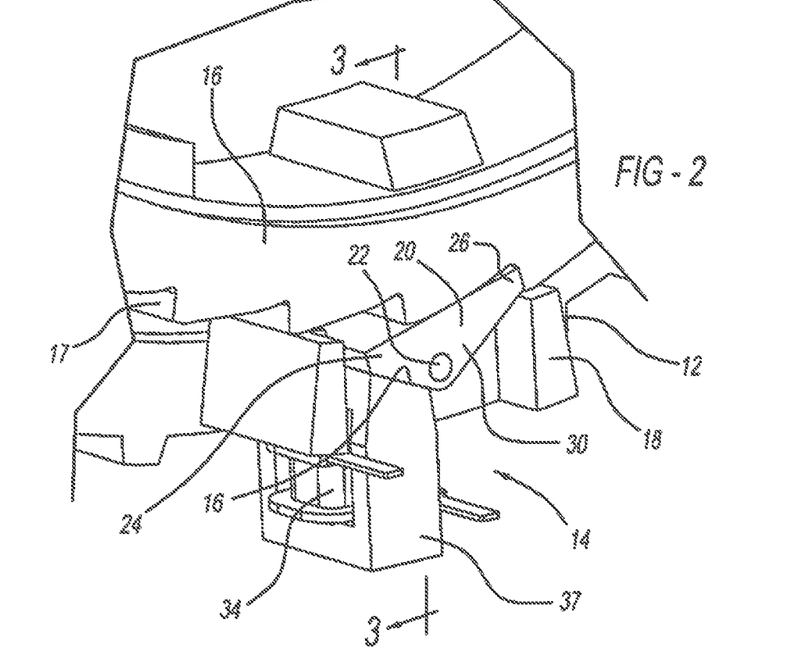
FIG. 2 is a detailed view of the actuation module of FIG. 1 of the present invention.
Figure 3:
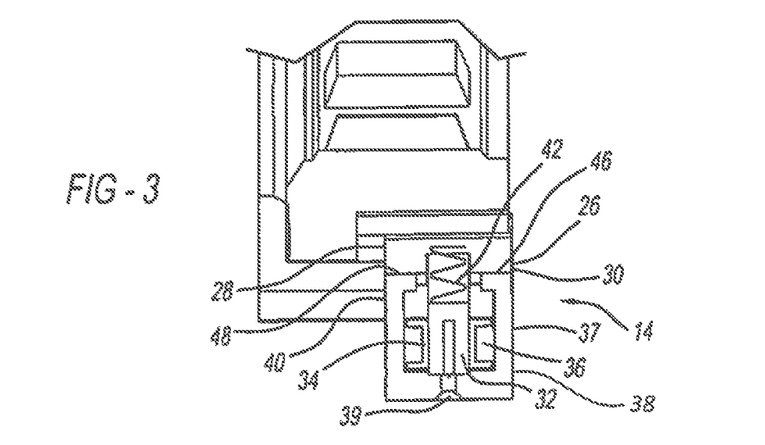
FIG. 3 is a sectional view of the actuation module of FIG. 2 taken along line 3-3 of FIG. 2.
Figure 4:
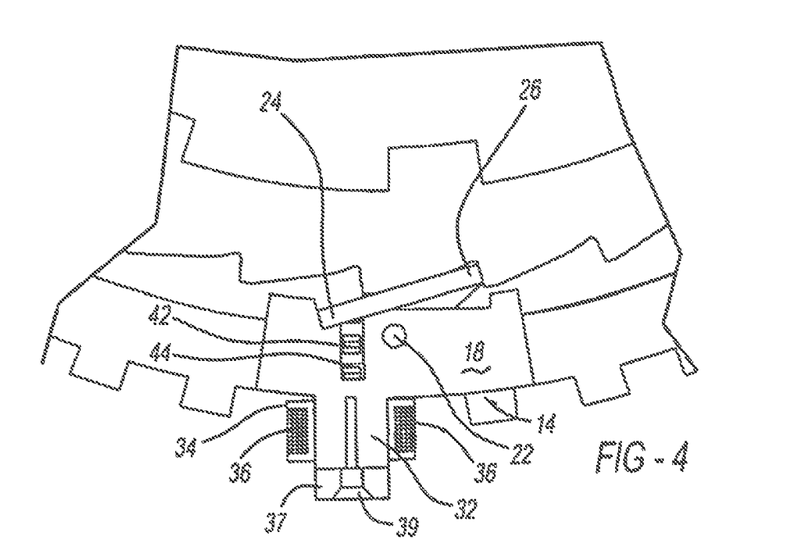
FIG. 4 is a sectional view of the actuation module of FIG. 2.
Figure 5:
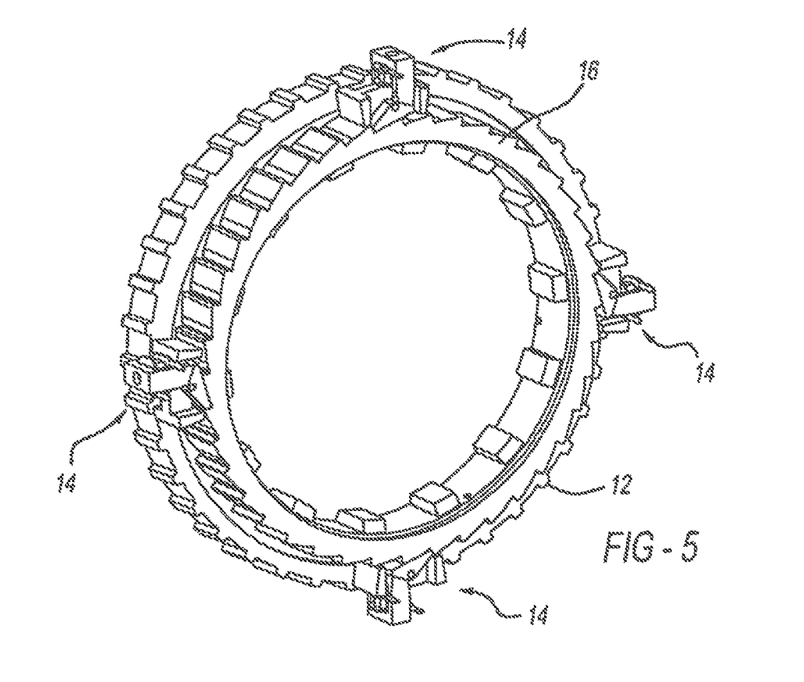
FIG. 5 is an assembly view of a clutch assembly similar to FIG. 1 but now showing a plurality of the actuation modules arranged in accordance with the present invention.
Figure 6:
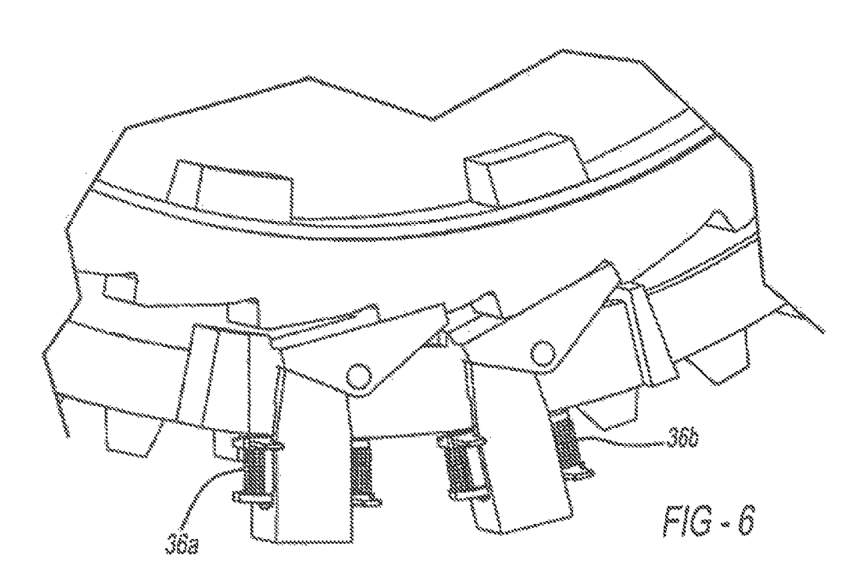
FIG. 6 is a detailed view of an alternate embodiment of an actuation module associated with the clutch module and showing a pair of actuated strut assemblies pivotably mounted on a common frame.

As can be seen in FIG. 6, an alternative strut actuation module 14a is generally similar to strut actuation module 14 of FIG. 2, except that a pair of strut and coil assemblies are mounted to a common frame 18'. Each strut and coil assembly is identified by common reference numerals but have "a" and "b" suffixes. Accordingly, all of the coils 36a and 36b (e.g., two in the embodiment shown) will work together to magnetize the housing, therefore increasing the magnetic field intensity and generating a greater magnetic force in the struts 20a, 20b and attracting them toward the closed position from the open position.

Figure 7:
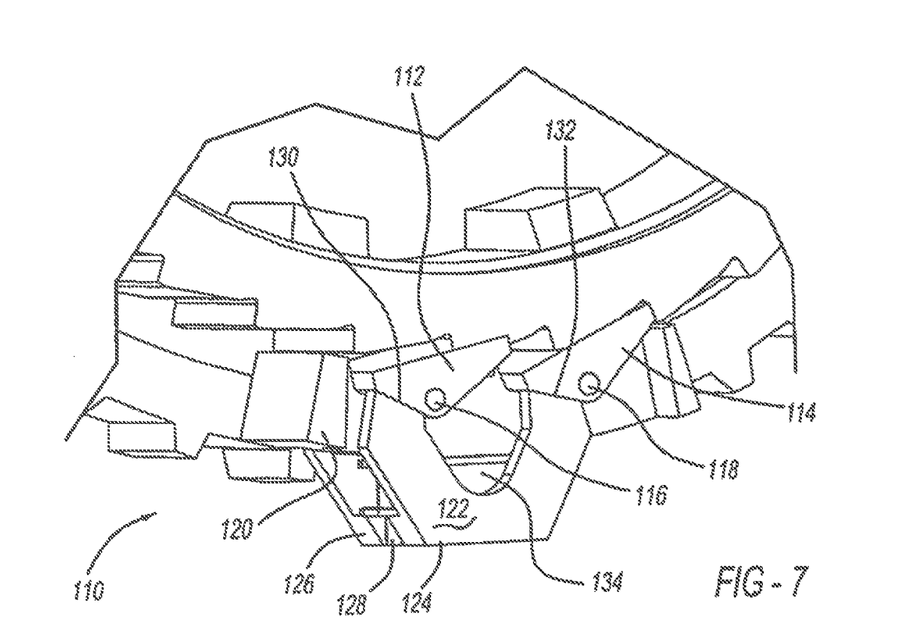
FIG. 7 is a detailed view of an alternate embodiment of an actuation module associated with the clutch module and showing a pair of actuated strut assemblies pivotably mounted on a common frame and using a common coil to actuate the struts.
Figure 8:
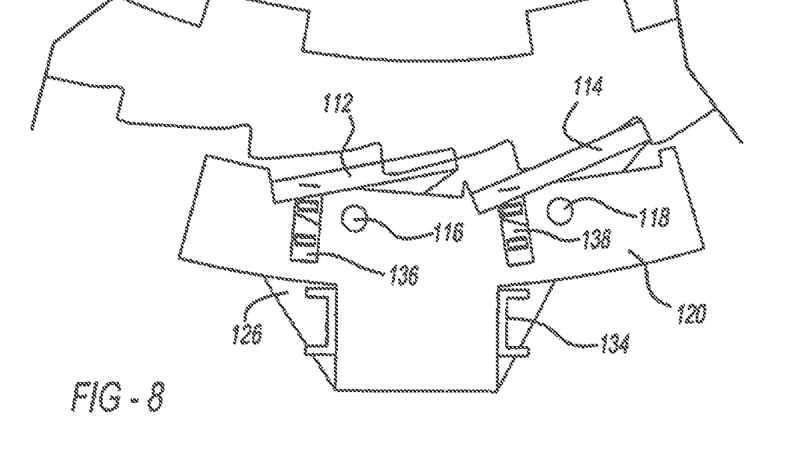
FIG. 8 is a sectional view of the actuation module of FIG. 7.

Referring now to FIGS. 7 and 8, there is provided an alternate embodiment of a strut actuation module 110 for use with clutch assembly 10. Strut actuation module 110 includes a pair of pivotal engagement struts 112 and 114 which pivot on pins 116 and 118 respectively, and are attached to a frame 120. A U-shaped member 122 is provided which includes a front U-shaped member 124 and a rear U-shaped member 126 which are magnetically and electrically coupled to one another through connection leg 128. Front U-shaped member 124 includes a pair of outer peripheral end portions 130 and 132 which engage the front sides of the struts 112 and 114. Rear U-shaped member 126 includes a pair of inner peripheral end portions (not shown) which are generally aligned respectively with outer peripheral end portions 130 and 132 and which engage the rear sides of struts 112 and 114. A single central bobbin 134 and coil 136 energizes the U-shaped members 124 and 126 for providing the coordinated actuation of the multiple struts. It will be readily appreciated that while two struts are shown, this invention could be configured to actuate more than just two struts if desired. As shown in FIG. 8, biasing springs 138 and 140 are provided for normally biasing the struts 112 and 114 into a freewheeling position. FIGS. 7 and 8 illustrate energization of coil 136 causing struts 112, 114 to be moved into engagement with ratchet teeth 17 on second clutch member 16.

Figure 9:
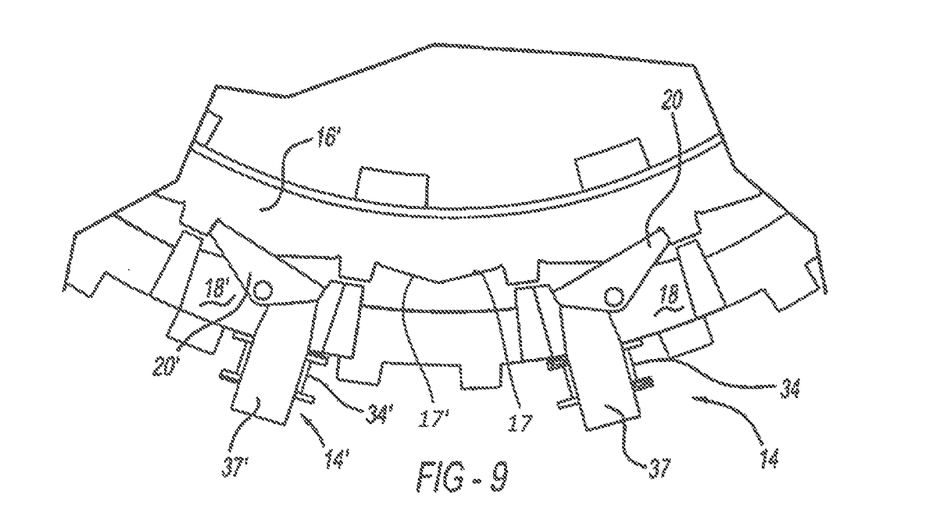
FIG. 9 is a detailed side view of a clutch assembly having a bi-directional clutch module and a pair of actuation modules oriented for operating in the bi-directional clutch module.

FIG. 9 shows the use of mirror image strut actuation modules 14 and 14' of the type shown in FIGS. 1-4 and as discussed above. Where the mirror image parts are labeled with prime numbers. The second clutch member 16' in this embodiment includes bi-directional cam members 17 and 17'. In operation, either actuation module, or sets of modules 14 or 14' can be energized depending on the direction which is desired for engaging and rotating the second clutch member 16'. Accordingly, FIG. 9 illustrates a bi-directional selectable clutch assembly.

Figure 10:
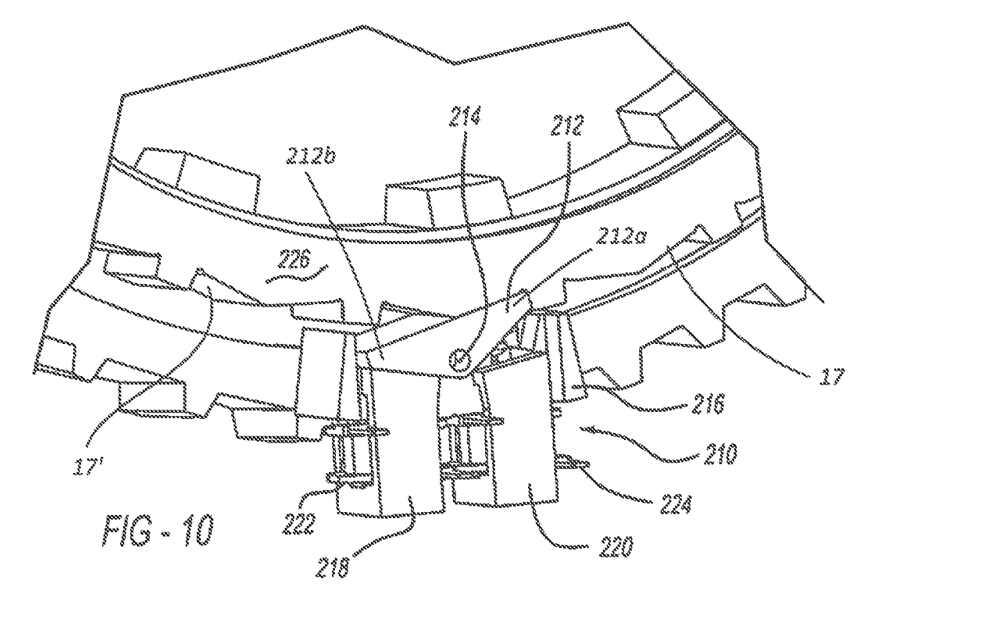
FIG. 10 is an alternate embodiment of a bi-directional actuation module showing a pair of coils operating a common pivotal strut.
Figure 11:
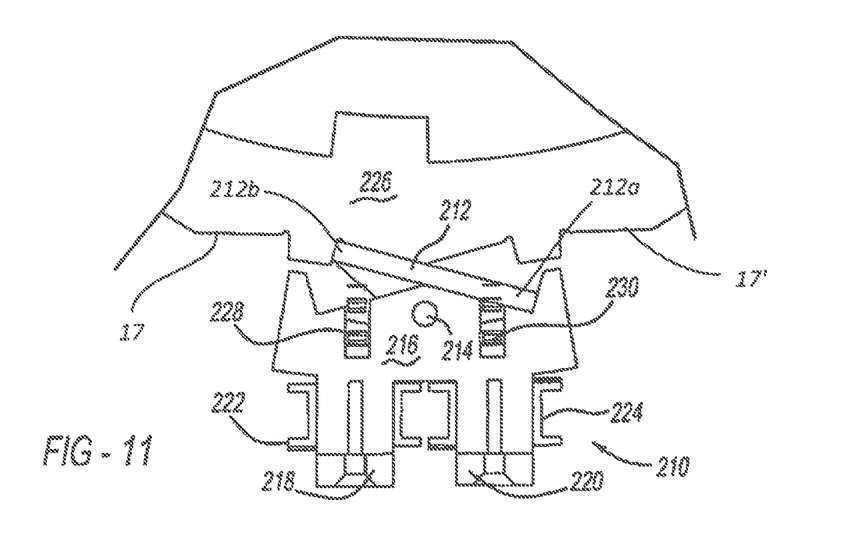
FIG. 11 is a sectional view of the bi-directional actuation module of FIG. 10.

Referring now to FIGS. 10 and 11 there is shown a second embodiment of a bi-directional strut actuation arrangement 210. In this embodiment a symmetrical strut member 212 is pivotally attached by a pin 214 to a frame 216. A pair of U-shaped members 218 and 220 with separate coil and bobbin assemblies 222 and 224 are used to selectively actuate the strut 212 from a first or freewheel position. Biasing springs 228 and 230 are provided for biasing the strut 212 to the free-wheeling position. FIG. 10 shows first coil/bobbin assembly 224 energized to cause strut 212 to move until a first engagement end 212a engages cam surface 17 on clutch member 226 and prevents relative rotation in a first direction. In contrast, FIG. 11 shows second coil/bobbin assembly 222 energized to cause strut 212 to move until its second engagement end 212b engages cam surface 17' on clutch member 226 and prevents relative rotation in a second direction.

Figure 12:
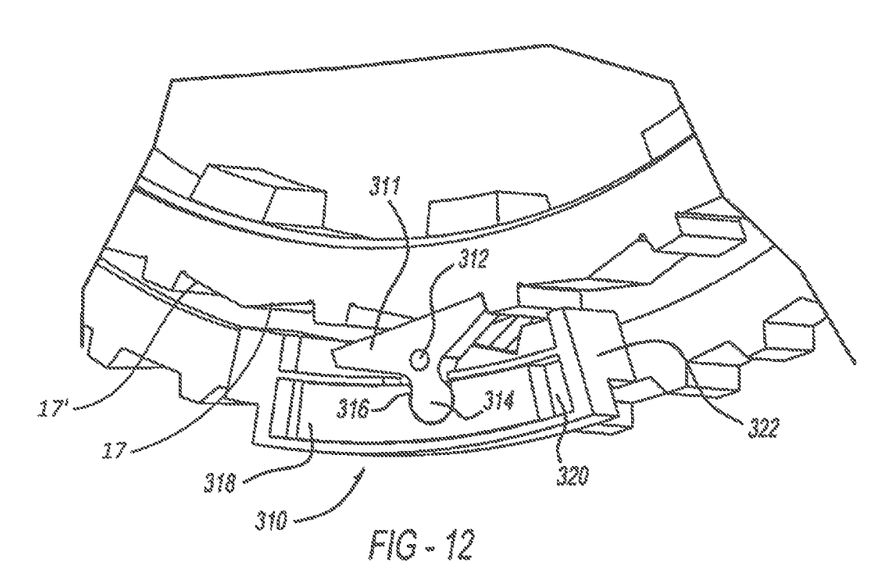
FIG. 12 is a sectional view of an alternate embodiment of a bi-directional actuation module using a mechanical actuation.
Figure 13:
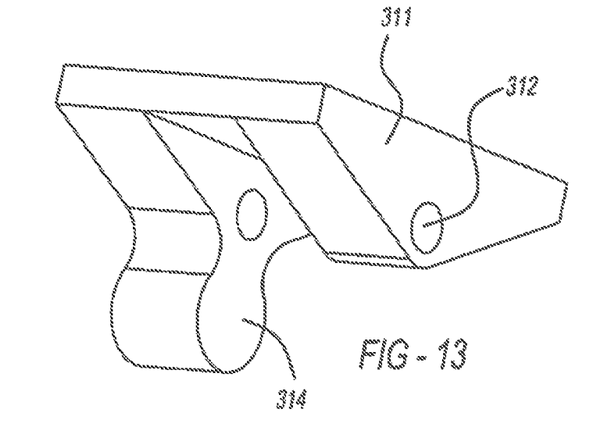
FIG. 13 is a perspective view of the strut member shown in FIG. 12.

Referring now to FIGS. 12 and 13, there is provided an alternate embodiment of a two way clutch actuation module 310. In this embodiment, a strut 311 is provided which is pivotal about a pin 312 by way of an actuation arm 314 which is engaged by a corresponding orifice 316 in an actuation slider 318 with slides in a track 320 formed in frame 322. In this embodiment the slider 318 may be powered by any number of mechanisms such as hydraulics, pneumatics, a solenoid, a servo, a ball screw arrangement, stepper motor, or the like for moving the sliding member back and forth in the track for actuation of the strut in an opposite direction.

In a further alternate embodiment, a bi-directional actuation module may be provided by using a permanently magnetized symmetrical strut member with a U shaped member which has legs on either side of the pivot. In this embodiment, the frame includes a pin portion extending from the frame and having and insulated bobbin with an energizable coil surrounding the bobbin. The U-shaped member includes a pair of actuation legs attached to said pin member and extends between a first polarized end of said strut and a second peripheral end of said leg being adjacent to a second polarized end of said strut. In this embodiment when the coil is energized the peripheral ends of said legs are polarized for moving said strut to a first position and when energized in an opposite direction the legs are polarized for moving the strut in an opposite direction.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A clutch assembly, comprising:
a clutch module including a first clutch member and a second clutch member arranged to permit relative rotation therebetween, said second clutch member having a plurality of first and second cam surfaces formed thereon; and
a bi-directional strut actuation module including a frame mounted to said first clutch member, a strut pivotably moveable with respect to said frame and configured to include a first portion terminating in a first engagement end and a second portion terminating in a second engagement end, a first post member extending from said frame, a first energizeable coil assembly mounted on said first post member, a first U-shaped member attached to said first post member and having a pair of first actuation legs enclosing said first coil assembly and forming a first magnetic gap between said first portion of said strut and ends of said first actuation legs, a second post member extending from said frame, a second energizeable coil assembly mounted on said second post member, and a second U-shaped member attached to said second post member and having a pair of second actuation legs enclosing said second coil assembly and forming a second magnetic gap between said second portion of said strut and ends of said second actuation legs,
wherein energization of said first coil assembly causes said first portion of said strut to be magnetically attracted toward said ends of said first legs on said first U-shaped member for causing said strut to pivot and locate its second engagement end in engagement with one of said second cam surfaces so as to prevent rotation of said second clutch member relative to said first clutch member in a first rotary direction, and wherein energization of said second coil assembly causes said second portion of said strut to be magnetically attracted toward said ends of said second legs on said second U-shaped member for causing said strut to pivot and locate its first engagement end in engagement with one of said first cam surfaces so as to prevent rotation of said second clutch member relative to said first clutch member in a second rotary direction.

2. The clutch assembly of claim 1 wherein said bi-directional strut actuation module further includes a first biasing member arranged between said frame and said first portion of said strut for normally biasing said strut such that its second engagement end is disengaged from said second cam surfaces, and a second biasing member arranged between said frame and said second portion of said strut for normally biasing said strut such that its first engagement end is disengaged from said first came surfaces.

3. The clutch assembly of claim 1 wherein an intermediate portion of said strut located between its first and second portions is pivotable about a pivot pin secured to said frame.

4. The clutch assembly of claim 1 further comprising a plurality of said bi-directional strut actuation modules.

5. The clutch assembly of claim 4 wherein said plurality of said bi-directional strut actuation modules are positioned to be circumferentially spaced, and wherein each bi-directional strut actuation module has a frame mounted to said first clutch member.

6. The clutch assembly of claim 1 wherein said first and second post members are formed integrally with said frame, wherein said first coil assembly is configured to surround said first post member, wherein said second coil assembly is configured to surround said second post member, wherein said first U-shaped member includes a first base segment interconnecting said pair of first actuation legs and which is secured to said first post member, and wherein said second U-shaped member includes a second base segment interconnecting said pair of second actuation legs and which is secured to said second post member.

7. The clutch assembly of claim 1 wherein said strut is normally biased to a bi-directional free-wheel position disengaged from said first and second cam surfaces so as to permit said second clutch member to rotate relative to said first clutch member in both of said first and second rotary directions, wherein energization of said first coil assembly causes said strut to move from said free-wheel position into a first locking position so as to prevent relative rotation in said first rotary direction and permit relative rotation in said second rotary direction, and wherein energization of said second coil assembly causes said strut to move from its freewheel position into a second locking position so as to prevent relative rotation in said second rotary direction and permit relative rotation in said first rotary direction.

8. A bi-directional clutch assembly, comprising:
a first clutch member;
a second clutch member arranged to facilitate rotation relative to said first clutch member, said second clutch member having a plurality of first cam surfaces and a plurality of second cam surfaces; and
a bi-directional strut actuation module mounted to said first clutch member and configured to selectively engage one of said first cam surfaces to prevent rotation of said second clutch member in a first rotary direction and selectively engage one of said second cam surfaces to prevent rotation of said second clutch member in a second rotary direction, said strut actuation module including a frame secured to said first clutch member and defining first and second pole pieces, a strut mounted to said frame for pivotal movement relative to said first and second cam surfaces, a first energizeable coil assembly mounted on said first pole piece, a second energizeable coil assembly mounted on said second pole piece, a first U-shaped housing member mounted to said first pole piece to enclose said first coil assembly, a second U-shaped housing member mounted to said second pole pieces to enclose said second coil assembly, and a biasing arrangement for normally biasing said strut to a released position when said first and second coil assemblies are non-energized, said strut having a first portion defining a first engagement end and a second portion defining a second engagement end, said first U-shaped housing member including a pair of laterally-spaced first legs configured to straddle said frame and each having a first end surface defining a first air gap with said first portion of said strut, said second U-shaped housing member including a pair of laterally-spaced second legs configured to straddle said frame and each having a second end surface defining a second air gap with said second portion of said strut,
wherein energization of said first coil assembly causes said first portion of said strut to be magnetically attracted toward said first end surfaces of said first legs on said first U-shaped housing member for causing said strut to pivot from said released position into a first locked position so as to locate said second engagement end in engagement with one of said second cam surfaces to prevent rotation of said second clutch member in said second rotary direction, and wherein energization of said second coil assembly causes said second portion of said strut to be magnetically attracted toward said second end surfaces of said second legs on said second U-shaped housing member for causing said strut to pivot from said released position into a second locked position so as to locate said first engagement end in engagement with one of said first cam surfaces to prevent rotation of said second clutch member in said first rotary direction.

9. The clutch assembly of claim 8 wherein said biasing arrangement includes a first biasing member disposed between said frame and said first portion of said strut, and a second biasing member disposed between said frame and said second portion of said strut, and wherein said first and second biasing members are configured to normally bias said strut toward said release position.

10. The clutch assembly of claim 8 wherein an intermediate portion of said strut located between its first and second portions is pivotable about a pivot pin secured to said frame.

11. The clutch assembly of claim 8 further comprising a plurality of said bi-directional strut actuation modules.

12. The clutch assembly of claim 8 wherein said plurality of said bi-directional strut actuation modules are positioned to be circumferentially spaced, and wherein each bi-directional strut actuation module has a frame mounted to said first clutch member.

13. A selectable clutch assembly, comprising:
a clutch module including a first clutch ring configured to be secured to a stationary component, and a second clutch ring configured to be selectively rotatable relative to said first clutch ring in first and second rotary directions, said second clutch ring being formed to include a plurality of first ratchet-type surfaces and a plurality of second ratchet-type cam surfaces; and
a strut actuation module including a frame adapted to be secured to said first clutch ring, a strut mounted to said frame and pivotably moveable between three distinct positions relative to said first and second cam surfaces; a first pole piece extending from said frame and having a first energizeable coil assembly mounted thereon, a second pole piece extending from said frame and having a second energizeable coil assembly mounted thereon, a first U-shaped housing member secured to said first pole piece and having a pair of laterally-spaced first legs straddling said frame and enclosing said first coil assembly, a second U-shaped housing member secured to said second pole piece and having a pair of laterally-spaced second legs straddling said frame and enclosing said second coil assembly;
wherein said strut includes a first portion defining a first engagement end and a second portion defining a second engagement end, wherein a biasing arrangement locates said strut in a first position with said first engagement end disengaged from said first cam surfaces and said second engagement end disengaged from said second cam surfaces when said first and second coil assemblies are non-energized, wherein energization of said first coil assembly causes said first portion of said strut to be magnetically attracted toward said first legs of said first U-shaped housing member for locating said second engagement end in engagement with one of said second cam surfaces to prevent rotation of said second clutch ring in a first rotary direction relative to said first clutch ring, and wherein energization of said second coil assembly causes said second portion of said strut to be magnetically attracted toward said second legs of said second U-shaped housing member for locating said first engagement end in engagement with one of said first cam surfaces to prevent rotation of said second clutch ring in a second rotary direction relative to said first clutch ring.

14. The selectable clutch assembly of claim 13 wherein an intermediate portion of said strut located between its first and second portions is pivotable about a pivot pin secured to said frame.

15. The selectable clutch assembly of claim 13 further comprising a plurality of said bi-directional strut actuation modules.

16. The selectable clutch assembly of claim 15 wherein said plurality of said bi-directional strut actuation modules are positioned to be circumferentially spaced, and wherein each bi-directional strut actuation module has a frame mounted to said first clutch member.

* * * * *